Patented July 8, 1952

2,602,799

UNITED STATES PATENT OFFICE 2,602,799

IMIDAZOLONES AND METHOD FOR PRODUCING THE SAME

Moses Wolf Goldberg, Upper Montclair, and Hanns Hanina Lehr, Montclair, N. J., assignors to Hoffmann-La Roche Inc., Nutley, N. J., a corporation of New Jersey No Drawing. Application February 6, 1952, Serial No. 270,294

8 Claims. (Cl. 260—309.6)

The present invention relates to new imidazolone derivatives which in one of their tautomeric forms can be designated as 2-lower alkyl-5-(1-lower alkyl aliphatic hydrocarbon-idene)-4-imidazolones, and the acid addition salts thereof, wherein the lower alkyl group in the 2-position contains at least two carbon atoms, and the aliphatic hydrocarbon-idene radical is an alkylidene radical containing at least two carbon atoms or an alkenylidene radical. Thus, for example, the lower alkyl group in the 2-position may be ethyl, propyl, butyl, and the like; the 1-lower alkyl may be, for example, methyl or ethyl, and the like; and the aliphatic hydrocarbon-idene radical may be a straight or branched alkylidene radical containing, for example, from 2–10 carbon atoms, or an alkenylidene radical. The invention also embraces the method for producing the new compounds. The compounds of our invention are useful as sedatives and hypnotics.

The 2-lower alkyl-5-(1-lower alkyl aliphatic hydrocarbon-idene)-4-imidazolones can be prepared by reacting together a lower alkylimidic acid alkyl ester, e. g. propionimidic acid ethyl ester, butyrimidic acid ethyl ester, or valerimidic acid ethyl ester, a lower alkyl ester of glycine, e. g. glycine ethyl ester, and a lower alkyl aliphatic hydrocarbon ketone of the following formula: R.CO.R₁, wherein R is a lower alkyl and R₁ is an aliphatic hydrocarbon radical, e. g. an alkyl or alkenyl radical.

Our new imidazolone derivatives may be represented by the following general formula:

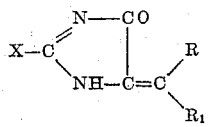

where X is lower alkyl containing at least two carbon atoms, and R and R₁ have the significance given in the preceding paragraph.

The reagents may be employed in equimolecular amounts or, if desired, the ketones may be employed in excess, the excess serving as a solvent. The reaction is preferably carried out by heating the mixture of reagents per se or in the presence of a suitable diluent, e. g. benzene.

The lower alkylimidic acid alkyl esters employed in the reaction were prepared from the corresponding hydrochlorides by neutralizing with aqueous potassium hydroxide, and extraction with ether, as illustrated by the following examples:

Example A 13.8 grams of propionimidic acid ethyl ester hydrochloride were dissolved in a minimum amount of water. 100 cc. of ether were added to the resulting solution, and the mixture was cooled to 0°–10° C. There was then added in small portions, a 40 per cent aqueous potassium hydroxide solution with shaking until the reaction mixture was alkaline to litmus. The mixture was saturated with potassium carbonate, the ether layer was decanted and the aqueous phase extracted four times with 100 cc. portions of ether. The combined ether extracts were dried over sodium sulfate. After removal of the ether in vacuo, propionimidic acid ethyl ester was obtained as a colorless liquid.

Example B

Butyrimidic acid ethyl ester was obtained by the same procedure as employed in Example A, there being used 15.2 grams of butyrimidic acid ethyl ester hydrochloride in place of the propionimidic acid ethyl ester hydrochloride. The compound was obtained as a colorless liquid.

Example C

Valerimidic acid ethyl ester was obtained by the same procedure as employed in Example A, there being used 16.6 grams of valerimidic acid ethyl ester hydrochloride instead of the propionimidic acid ethyl ester hydrochloride. The compound was obtained as a colorless liquid.

The following examples will serve to illustrate the invention. It will be understood that the invention is intended to embrace the 2-lower-alkyl-5-(1-lower alkyl aliphatic hydrocarbon-idene)-4-imidazolones in their various tautomeric forms, and the claims are to be thus construed.

Example 1

8 grams of butyrimidic acid ethyl ester and 7 grams of glycine ethyl ester were refluxed for 20 hours in 100 cc. of acetone. After removal of the excess acetone in vacuo, the solid residue was recrystallized from ligroin. 2-propyl-5-(1-methylethylidene)-4-imidazolone was obtained in the form of slightly yellow crystals, M. P. 110–111° C.

Example 2

8 grams of butyrimidic acid ethyl ester and 7 grams of glycine ethyl ester were refluxed for 5½ hours in 40 cc. of methylethylketone. After removal of the excess methylethylketone in vacuo the residue was extracted repeatedly with hot ligroin. The crystals obtained from the combined extracts upon cooling were recrystallized from ligroin. 2-propyl - 5 - (1 - methylpropylidene)-4-imidazolone was thus obtained, M. P. 106.5–108° C.

Example 3

7 grams of propionimidic acid ethyl ester and 7 grams of glycine ethyl ester were refluxed in 50 cc. of acetone for 4 hours. A small amount of insolubles was filtered off and the filtrate evaporated to dryness. The residue was crytallized from ligroin yielding white crystals of 2-ethyl-5-(1-methyl-ethylidene) - 4 - imidazolone, M. P. 112–113° C.

Example 4

9 grams of butyrimidic acid ethyl ester, 8 grams of glycine ethyl ester, and 15 grams of diethyiketone were refluxed for 6 hours. After removal of excess ketone in vacuo, the residue was dissolved in acetone and filtered from insolubles. The acetone filtrate, upon evaporation, yielded an oily residue which was repeatedly extracted with petroleum ether. The combined extracts were evaporated to dryness yielding an oily residue comprising 2-propyl-5-(1-ethylpropylidene)-4-imidazolone. The imidazolone was converted to the hydrochloride by dissolving it in a minimum of ethanol, saturating the alcoholic solution with dry hydrogen chloride and precipitating the 2 - propyl-5-(1-ethylpropylidene)-4-imidazolone hydrochloride by the addition of absolute ether. After recrystallization from ethanol-ether, the hydrochloride was obtained in the form of white crystals, M. P. 178–180° C. with decomposition.

Example 5

11.5 grams of butyrimidic acid ethyl ester, 10 grams of glycine ethyl ester, and 25 cc. of methylpropylketone were refluxed for 6 hours. The dark brown oily residue obtained after removal of excess ketone in vacuo was extracted repeatedly with petroleum ether. The combined extracts yielded, upon evaporation, a light colored oil comprising 2-propyl-5-(1-methylbutylidene)-4-imidazolone. The base was converted to the hydrochloride in the same manner as described in Example 4. The 2-propyl-5-(1-methylbutylidene)-4-imidazolone hydrochloride melted at 159–161° C. with decomposition.

Example 6

11.5 grams of butyrimidic acid ethyl ester, 10.3 grams of glycine ethyl ester, and 11.4 grams of methylamylketone were refluxed in 50 cc. of benzene for 6 hours. The solvent was removed in vacuo and the residue dissolved in acetone. After filtration from precipitated solids, the solvent was removed from the filtrate in vacuo and the residue extracted repeatedly with petroleum ether. The combined extracts yielded upon evaporation a light colored oil comprising 2-propyl - 5 - (1 - methylhexylidene) - 4 - imidazolone, which was converted to the hydrochloride in the same manner as described in Example 4. Upon crystallization from ethanol-ether, the hydrochloride was obtained in the form of white crystals, M. P. 157–159° C. with decomposition.

Example 7

11.5 grams of butyrimidic acid ethyl ester, 10.3 grams of glycine ethyl ester, and 12.8 grams of methylhexylketone were refluxed in 50 cc. of benzene for 5 hours. After removal of the solvent in vacuo, the residue was dissolved in acetone, the acetone solution filtered from solids, and the filtrate evaporated to dryness. The residual oil was extracted repeatedly with petroleum ether and the combined extracts were evaporated to dryness, yielding a light colored oil comprising 2 - propyl - 5 - (1 - methylheptylidene) - 4 - imidazolone. The free base was converted to the hydrochloride in the same manner as described in Example 4. Upon crystallization from ethanol-ether the hydrochloride was obtained in the form of white crystals, M. P. 158–160° C. with decomposition.

Example 8

11.5 grams of butyrimidic acid ethyl ester, 10.3 grams of glycine ethyl ester, and 10 grams of allylacetone were refluxed in 50 cc. of benzene for 6 hours. After removal of the solvent in vacuo the residue was dissolved in acetone and filtered from insolubles. The filtrate was evaporated to dryness, and the oily residue was repeatedly extracted with ligroin. The combined extracts were evaporated to dryness, yielding a light colored oil comprising 2-propyl-5-(1-methyl-4-penten-1-ylidene)-4-imidazolone. The compound was converted to the hydrochloride in the same manner as described in Example 4. Upon crystallization from ethanol-ether, the hydrochloride was obtained in the form of white crystals, M. P. 155–157° C.

Example 9

34 grams of butyrimidic acid ethyl ester, 30 grams of glycine ethyl ester, and 50 cc. of methylisopropylketone were refluxed for 6 hours. Excess ketone was removed in vacuo, the residue dissolved in acetone, and the solution filtered and concentrated in vacuo. The viscous oily residue was extracted several times with ligroin, and the combined extracts evaporated to dryness. The resulting oily residue comprising 2-propyl-5-(1-methylisobutylidene)-4-imidazolone was converted to the hydrochloride in the same manner as described in Example 4. Upon crystallization from ethanol-ether the hydrochloride was obtained in the form of white crystals, M. P. 181–183° C. with decomposition.

Example 10

11.5 grams of butyrimidic acid ethyl ester, 10 grams of glycine ethyl ester, and 10 grams of methylisobutylketone were refluxed in 25 cc. of benzene for 6 hours. The solvent was removed in vacuo, the residue dissolved in acetone, the solution filtered, and the filtrate evaporated to dryness. The residue was repeatedly extracted with petroleum ether and the combined extracts were evaporated to dryness, yielding an oil comprising 2 - propyl - 5 - (1-methylisoamylidene)-4-imidazolone, which was converted into the hydrochloride in the same manner as described in Example 4. Upon crystallization from ethanol-ether the hydrochloride was obtained in the form of white crystals, M. P. 198–200° C. with decomposition.

Example 11

10 grams of valerimidic acid ethyl ester and 8 grams of glycine ethyl ester were refluxed for 23 hours in 100 cc. of acetone. After removal of excess acetone, the residue, comprising 2-butyl-5-(1-methylethylidene)-5-imidazolone, was dissolved in a minimum of ethanol. The alcoholic solution was saturated with hydrogen chloride. 2 - butyl - 5 - (1 - methylethylidene) - 4 - imidazolone hydrochloride crystallized in the form of white needles, and after recrystallization from ethanol, melted at 217–219° C. with decomposition.

Example 12

11.5 grams of butyrimidic acid ethyl ester, 10 grams of glycine ethyl ester, and 16 grams of methylnonylketone were refluxed in 75 cc. of benzene for 8 hours. After removal of the benzene in vacuo, the residue was treated with acetone, the precipitated solids were filtered off, and the filtrate was evaporated to dryness. The oily residue was repeatedly extracted with ligroin, and the combined extracts were evaporated to dryness yielding a light colored oil comprising 2-propyl-5-(1-methyldecylidene)-4-imidazolone. The compound was converted into the hydrochloride in the same manner as described in Example 4. Upon crystallization from ethanol-ether, the hydrochloride was obtained in the form of white crystals, M. P. 153–156° C. with decomposition.

It is to be understood that other acid addition salts than those illustrated in the foregoing examples can be prepared. Thus, by treating the compounds in the free base form with any suitable acid, e. g. hydrobromic acid, sulfuric acid, phosphoric acid, and the like, the corresponding acid addition salts can be obtained.

We claim:

1. A compound selected from the group consisting of 2-lower alkyl-5-(1-lower alkyl aliphatic hydrocarbon-idene)-4-imidazolones, wherein the lower alkyl group in the 2-position contains at least two carbon atoms, and the aliphatic hydrocarbon-idene group is selected from the group consisting of an alkylidene radical containing at least two carbon atoms and an alkenylidene radical, and the acid addition salts thereof.

2. 2-lower alkyl-5-(1-lower alkyl alkylidene)-4-imidazolones, wherein the lower alkyl group in the 2-position and the alkylidene group each contain at least two carbon atoms.

3. 2-lower alkyl-5-(1-lower alkyl alkenylidene)-4-imidazolones, wherein the lower alkyl group in the 2-position contains at least two carbon atoms.

4. 2 - propyl - 5 - (1- methylbutylidene) - 4 - imidazolone hydrochloride.

5. 2 - propyl - 5 - (1 - methylheptylidene) - 4 - imidazolone hydrochloride.

6. 2 - propyl - 5 - (1 - methylhexylidene) - 4 - imidazolone hydrochloride.

7. 2 - propyl - 5 - (1 - methyl - 4 - penten - 1 - ylidene)-4-imidazolone hydrochloride.

8. 2 - propyl - 5 - (1 - methylisoamylidene) - 4-imidazolone hydrochloride.

MOSES WOLF GOLDBERG.
HANNS HANINA LEHR.

No references cited.